United States Patent
Bocanegra et al.

(10) Patent No.: US 6,836,603 B1
(45) Date of Patent: Dec. 28, 2004

(54) OPTICAL FIBER CABLES

(75) Inventors: Luis M. Bocanegra, Alpharetta, GA (US); Harold P. Debban, Snellville, GA (US); Kenneth L. Taylor, Lawrenceville, GA (US); Peter A. Weimann, Atlanta, GA (US)

(73) Assignee: Furukawa Electric North America, Inc., Norcross, GA (US)

( * ) Notice: Subject to any disclaimer, the term of this patent is extended or adjusted under 35 U.S.C. 154(b) by 0 days.

(21) Appl. No.: 10/640,730

(22) Filed: Aug. 14, 2003

(51) Int. Cl.$^7$ ................................................. G02B 6/44
(52) U.S. Cl. ..................................................... 385/113
(58) Field of Search .................................. 385/100–114

(56) References Cited

U.S. PATENT DOCUMENTS 6,493,491 B1 * 12/2002 Shen et al. .................. 385/113
6,501,888 B2 * 12/2002 Gimblet et al. ............. 385/113

FOREIGN PATENT DOCUMENTS

JP 8-304675 11/1996

* cited by examiner

Primary Examiner—Khiem Nguyen
(74) Attorney, Agent, or Firm—Peter V. D. Wilde

(57) ABSTRACT

The specification describes an optical fiber drop cable with a flat configuration, corresponding to "A-drop" cable. The cable is dry, and has a conformal primary encasement that is coupled directly to the optical fiber(s). Coupling the optical fibers and the exterior surface of the cable provides unexpected benefits, reducing the tendency of the fiber cable to buckle or shrink-back, and reducing the susceptibility of the cable to fiber retraction. The drop cable comprises three in-line components encased in a conformal secondary encasement. The center component comprises the optical fiber(s) coupled to the primary encasement. Located on each side of the optical fiber system are strength members. In a preferred embodiment, dimensions of the three elements are chosen so that the diameter of the center component is less than the diameter of either strength member. This provides crush protection for the optical fiber system. In an alternative embodiment, the cable is round on the end portions, with the middle portion, the portion that contains the optical fiber(s), dished so that the hyphen between the end portions has concave sides.

14 Claims, 2 Drawing Sheets

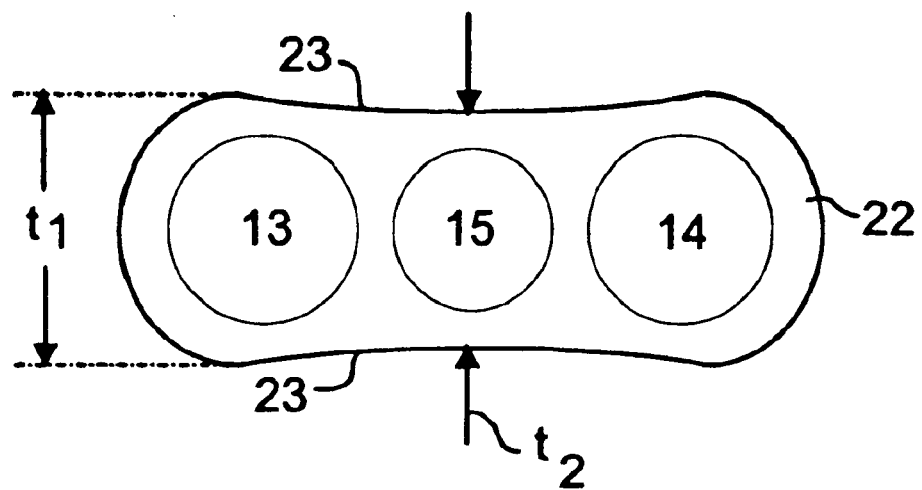
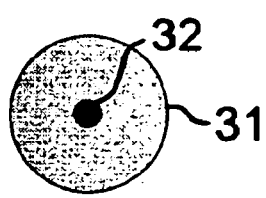
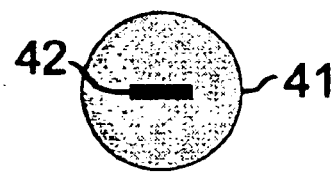
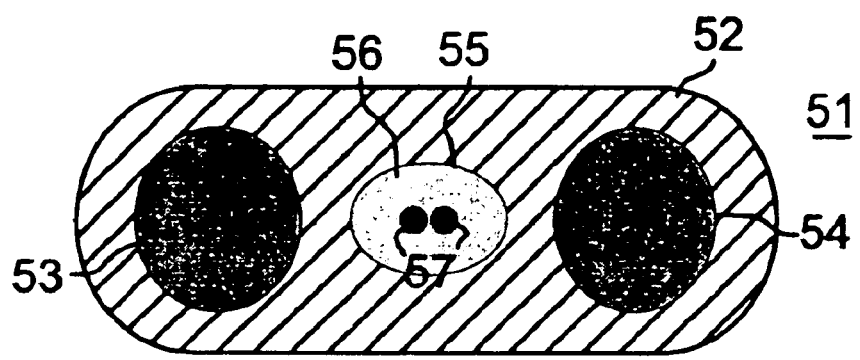

OPTICAL FIBER CABLES

FIELD OF THE INVENTION

This invention relates to optical fiber cables specially adapted for drop line applications.

BACKGROUND OF THE INVENTION

Fiber-to-the-premises (FTTP) from local telephone and cable service providers is being implemented at a rapid pace. This service requires a broadband optical fiber distribution network comprising local optical fiber distribution cables that are installed in neighborhood and city streets. The local distribution cable is a large fiber count (multi-fiber) cable. Single fiber or few fiber cables are used for the "drop" line from the street to the premises. In many cases, aerial drop lines are used, and these have special requirements.

Optical fiber drop cables are made in several designs. Most of these designs mimic earlier copper cable versions. Physical resemblance is deliberate, so that the external cable appearance matches that of existing copper versions, and standard hardware and installation equipment may be used for both. Thus "A-drop" optical fiber cable is an optical fiber version of A-drop copper cable, and is made in the same flat or ribbon-like configuration. Aerial drop cable typically has one or more strength members for support. A common A-drop or flat cable design comprises one or more optical fibers between two strength members. See for example, U.S. Pat. No. 6,501,888.

Optical fiber cables also commonly contain gel-filling compounds for preventing water excursion in the cable. When water enters a cable, flow of water along the length of the cable is blocked by the gel. However, gel filled cables are difficult to install and repair. Moreover, since the drop wire is typically attached to the side of a customer's home or building, bleeding of ingredients in the cable onto the customers building may cause cosmetic or other problems.

Since aerial drop cables are subjected to considerable movement and sag due to wind and ice build-up, and due to mechanical strain caused by differential thermal expansion, aerial drop cables commonly have a loose fiber design. In this design the optical fibers float within the cable encasement. The premise is that the optical fibers are mechanically isolated from at least some of this movement. However, a drawback to this design is that the cable may suffer fiber retraction due to the movement just mentioned. Fiber retraction occurs when the outer sleeve of the optical fiber cable sags or is stretched relative to the optical fibers. Excessive fiber retraction may result in damage or breakage of the fibers.

Several examples of drop cable are described in U.S. Pat. No. 4,761,053. Most of these examples describe copper drop wire but a few optical fiber versions are given as well. These show loose fiber designs as just mentioned.

An optical fiber cable design that resembles an A-drop design, i.e. has a relatively small, flat, cross section, is described in Japanese Patent JP-A-8304675. In this design the strength members are optical fibers. Since the optical fiber strength members require separate coatings, this structure adds unnecessary elements, complexity, and cost.

STATEMENT OF THE INVENTION

We have designed an optical fiber cable suitable for drop cable applications which has an "A-drop" design, meaning it is readily interchangeable with existing copper cable drop-wire technology. The new A-drop optical fiber design is dry, and has a primary encasement that is coupled directly to the optical fiber(s). We discovered that, contrary to conventional practice, increasing the coupling between the optical fibers and the exterior surface of the cable provides unexpected benefits, and reduces the tendency of optical fiber cables to buckle. The coupled design forms a unitary assembly that is more robust, and not susceptible, as are conventional designs, to fiber retraction. This property is especially important in drop cable, and will be described in more detail below. The use of a solid primary encasement, in contrast to the loose fiber designs, or the gel filled designs, allows the desired coupling between the outside cable sheath and the optical fibers. For convenience in this description, the encasement next to the optical fiber(s) will be referred to as the primary encasement, and the polymer coating for the overall cable assembly will be referred to as the secondary encasement. In the main embodiments of the invention the primary encasement is conformal to the optical fiber assembly and the secondary encasement is conformal to the primary encasement.

The optical fiber drop cable design of the invention comprises three in-line components encased in the secondary encasement. The center component of the cable contains the optical fiber(s) coupled to the primary encasement. The optical fiber(s) may comprise a single fiber, two or more bundled fibers, or one or more optical fiber ribbons, each with two or more fibers ribboned together. In each case, the optical fiber or optical fiber assembly (two or more fibers) is coated with the primary encasement. Reference to optical fiber assembly below is intended to be generic to all of these arrangements. Reference to optical fiber system below, refers to the center component of the cable, i.e. the optical fiber assembly of one or more fibers, and the primary encasement that is coupled to the optical fiber assembly.

Located on each side of the optical fiber system are strength members. Typically, these comprise high strength polymer or glass strands in a resin matrix. Dimensions of the three elements are chosen so that the diameter of the optical fiber system is less than the nominal diameter of either strength member. This provides crush protection for the optical fiber assembly.

In an alternative embodiment, the cable is round on the end portions, with the middle portion, the portion that contains the optical fiber system, dished so that the hyphen between the end portions has concave sides.

Increased coupling of the optical fiber assembly to the primary encasement, and the primary encasement to the secondary encasement, to yield the advantages mentioned above, is achieved in part by adhesion between both the optical fibers and the primary encasement and the optical fiber system (primary encasement) and the secondary encasement. Relatively high adhesion between the optical fiber assembly and the surrounding medium is important to prevent retraction of the optical fiber assembly within the cable.

BRIEF DESCRIPTION OF THE DRAWING

FIG. 4 is a diagram showing relevant dimensions used in the description of FIG. 3;

FIGS. 5 and 6 are sectional views of alternative optical fiber systems; and FIG. 7 is a view similar to FIG. 1 showing alternative cable design expedients.

DETAILED DESCRIPTION

Figure 1:
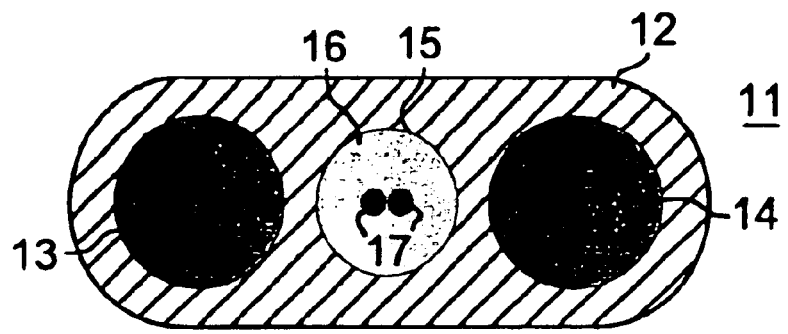
FIG. 1 is a sectional view of one embodiment of the optical fiber A-drop cable of the invention.

Referring to FIG. 1, a flat optical fiber drop cable is shown generally at 11. The cable has a racetrack shape, with relatively small dimensions. The overall width is less than 0.5 in., typically for A-drop cable, 0.30 in. The height (thickness) will typically vary from 0.3 to 0.7 times the width. A "racetrack" shape, as a descriptive term, is well known even to those not skilled in the art, and is used herein as a technical definition for two half circles joined by approximately straight lines.

Referring again to FIG. 1, the secondary encasement is shown at 12. In this design there are two strength members 13, 14, on either side of the optical fiber system 15. The optical fiber system 15 comprises two coated fibers 17 in the primary encasement 16. The three members, 13, 14, and 15 are preferably "in-line", i.e. their centers lie on the same axis. The strength members 13 and 14 serve three main functions. They are made of a material with high tensile strength, e.g. a resin with reinforcing fibers. Fibers for this purpose are well known and widely used. Examples are glass fibers and Kevlar (aramid) fiber. The resin may be any of a wide variety of polymer host materials, and is preferably a thermoset urethane or acrylate resin, cured by heat or UV radiation. The strength members 13 and 14 also serve as armoring to protect the sides of the cable. The most vulnerable part of a cable with a racetrack shape are the edges of the cable. Sharp instruments used for splicing, or sharp surfaces encountered in installation tend to impact the edges. With the in-line design, the optical fiber system is effectively protected from these hazards. A third function of the in-line design relies on the relative diameters of members 13, 14 and 15. As shown in the figure, strength members 13 and 14 typically have the same diameter, and that diameter is larger than the diameter of the optical fiber system 15. This property is deliberate. It provides a cable structure wherein the center optical fiber system is protected against crushing forces on the flat sidewalls of the cable.

Figure 2:
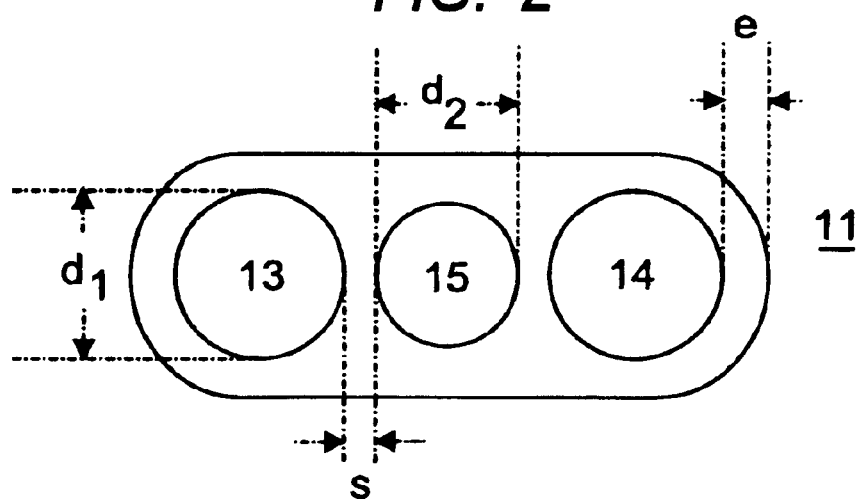
FIG. 2 is a diagram showing relevant dimensions used in the description of FIG. 1.

The relative dimensions, for reference purposes, of the flat cable of FIG. 1 are shown in FIG. 2. The diameter of the strength members 13 and 14 is $d_1$. The spacing between the strength members 13 and 14 and the optical fiber system 15 is s, and is typically the same on both sides. The thickness of the secondary encasement around the strength members is e. The diameter of the optical fiber system is $d_2$. In a typical design the optical fibers are cushioned in a relatively thick encasement, so the thickness of the primary encasement around the optical fibers is nominally $d_2$.

With reference to the dimension notations of FIG. 2, the width w of the flat cable of FIG. 1 is given by:

$$w=2e+2s+d_1+d_2$$

The thickness is given by $$t=2e+d_1$$

To achieve the result mentioned above, i.e. protection of optical fiber system against crushing forces on the flat sidewalls, the relationship between $d_1$ and $d_2$ should be:

$$d_1>d_2$$

and preferably:

$$d_1/d_2>1.05$$

For a flat cable with a thickness of 3.3 mm, $d_1$ may be 2.5 to 3.1 mm, and $d_2$ in that case would be approximately 2.4 mm to 2.95 mm, and less than d, as just described. Smaller cable cross sections may be preferred for cost benefits. From this standpoint a preferred design is $d_1$ 1.5–2.5 mm, and $d_2$ 1.0–2.0 mm, again with $d_2$ smaller than $d_1$.

Figure 3:
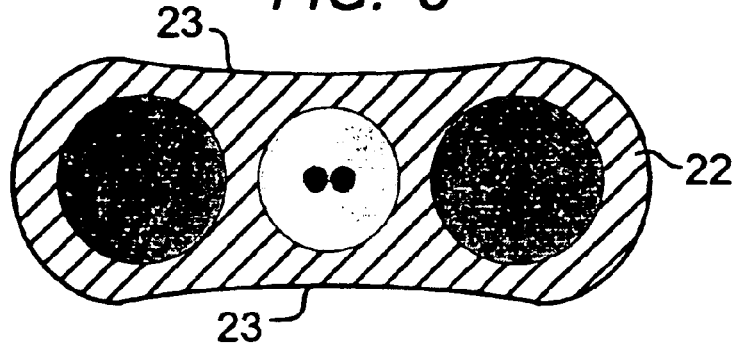
FIG. 3 is a sectional view of another embodiment of the optical fiber A-drop cable of the invention.

According to an alternative embodiment of the invention, shown in FIG. 3, the sidewalls 23 of the secondary encasement are re-entrant, i.e. concave. This structure may be preferred in building installations where the drop cable is installed in a duct. It will be recognized by those skilled in the art that the concave sidewalls 23 reduce the surface area of the cable that contacts a flat surface, for example, a flat duct surface. This reduces friction on the cable, and reduces the pulling force. With reference to the dimensions indicated in FIG. 4:

$$t_1>t_2$$

and preferably:

$$t_1/t_2>1.05$$

The secondary encasement will typically be formed by extrusion, and the shape of the outside surface of the cable will be determined by the design of the extrusion die. If the extrusion die has flat sidewalls, the reduced thickness $t_2$ in the region encasing the optical fiber system may occur inherently due to the relative dimensions $d_1$ and $d_2$, and the shrinkage of the secondary casing on curing. To achieve a flat sidewall structure as in FIG. 1 may require a die design where the sidewall of the die is slightly convex.

Differential shrinkage between the material comprising the secondary encasement and the primary encasement will also affect the amount of longitudinal shrink-back of the drop cable in service. To reduce that effect, it is preferred that the material of the secondary encasement contain at least 10% of a filler, such as calcium carbonate. The primary encasement may also contain at least 10% of a filler. Suitable materials for the secondary encasement are known in the art, for example Geon W2402, a drop cable grade polyvinylchloride resin available from the Polyone Corporation. This material is relatively soft, with a modulus of about 100 Mpa.

However, the detrimental consequences of shrink-back as well as fiber retraction are addressed inherently by the cable design of the invention. In conventional drop cables that have a loose fiber design, the outer sheath of the cable is free to shrink or distend (due to cable sag) independent of the optical fiber assembly. The coupling of the optical fiber system to the outer sheath (secondary encasement and strength members) in this invention minimizes differential dimensional changes between the optical fiber system and the outer encasement, reducing the likelihood of separation between elements in the cable, or breaking of the optical fibers. In addition, the coupled cable structure of the invention will retard both shrinkage and sagging of the overall cable assembly.

Alternative optical fiber systems are shown in FIGS. 5 and 6. FIG. 5 is a single fiber assembly showing optical fiber 32 and primary encasement 31. FIG. 6 is an optical fiber ribbon assembly with a four-fiber ribbon 42. Typical dimensions for a four-fiber ribbon are:

h=12 mils w=60 mils

For more details on the structure of optical fiber ribbons see U.S. Pat. No. 4,900,126, which is incorporated by reference herein. The number of fibers per ribbon may range from two to more than twenty. Moreover, ribbons may be stacked to further increase fiber count. However, drop cable usually has a relatively small fiber count, so the examples shown here are typical. It should be understood that FIGS. 5 and 6 show only two of a wide variety of options for the optical fiber system.

As mentioned earlier, in conventional cable designs, coupling between optical fibers and the outer surface of the cable is deliberately minimized. One approach to achieving this is a so-called "loose tube" assembly, which is a design that allows the optical fibers to "float" inside the tube. When small bends or dents occur in the tube they are minimally translated to the optical fibers.

In an alternative prior art approach, force translation between the optical fibers and the outer cable surface is minimized by reducing the adhesion between the optical fibers and the surrounding medium. The optical fibers are free to slide within the encasement, and tensile and compressive forces are less effectively coupled between them. Among other expedients, lubricants have been used.

In the optical fiber system of the invention the optical fibers 17 have a conformal primary encasement 16, i.e. the primary encasement 16 is conformal with respect to the optical fiber assembly. The secondary encasement 12 is conformal with respect to the optical fiber system. The materials forming the primary and secondary encasements may vary widely. Preferred specific materials suitable for the encasements are polyolefins and ester-based polymers such as polyethylene, polypropylene, polyvinylchloride, ethylene-vinyl acetate polymers, ethylene acrylic acid polymers, ester-based polymers, and copolymers of the foregoing. These materials are given by way of example are not limiting of potential suitable materials. In each case the density and other properties of the polymers may be tailored by methods well known in the art to provide the mechanical characteristics of the invention, as well as other desired properties. For example, drop cables that are used inside buildings may require fire-retardant polymers. An example is DGDA-1638-NT, a fire-retardant low-smoke zero-halogen resin available from the Dow Chemical Company.

A property of the encasement 16 is that it adheres to the optical fiber assembly. Adhesion between the optical fiber assembly and the primary encasement effectively translates stress between the optical fiber assembly and the secondary encasement.

The material of the secondary encasement is typically tailored to the intended application for the cable. For example, drop cables that are used inside buildings may require fire-retardant polymers, such as DGDA-1638-NT, a fire-retardant low-smoke zero-halogen resin available from the Dow Chemical Company. The outer cable material may be specially designed for air blown installations. See U.S. patent application Ser. No. 10/233,719, filed Sep. 3, 2002, incorporated by reference herein. For aerial drop cable applications, the secondary encasement may be loaded with carbon black to prevent degradation caused by UV sunlight. Other details of appropriate secondary encasement materials may be found in U.S. Pat. No. 6,317,542.

Another feature of the drop cable design is that the arrangement of the dual reinforcing members (13, 14 in FIG. 1) allows convenient stripping of the cable for splicing etc. To separate the optical fiber system from the cable, the end of the cable is notched at a point on either side of the optical fiber system, and, using the reinforcing members, the cable is pulled apart to expose the optical fiber system. The individual fibers are stripped, and spliced or connected, following conventional practice.

The amount of adhesion desired between the optical fiber system and the primary encasement may vary substantially depending on the system design. If adhesion is too low, stress on the secondary encasement will not be effectively translated to the optical fiber assembly. Accordingly, adhesion inhibiting means such as lubricants, are preferably avoided. It is also preferred that other elements or agents, such as yarns or tapes, that would interfere with a continuous polymer-to-polymer interface be avoided. Normally, a continuous polymer-to-polymer interface with adhesion in the desired range will occur as the result of the intrinsic material characteristics, i.e. the polymer-to-polymer intrinsic adhesion and the method used to apply the primary encasement. The result desired, i.e. the adhesion recommended, is easily obtained using known extrusion manufacturing methods. Other approaches may also be found useful. For example, one or both of the encasements may be a UV curable polymer, and applied by conventional UV cured coating techniques. Use of adhesion promoting materials, e.g. common adhesives, is also contemplated as within the scope of the invention. In a preferred embodiment, the primary encasement may be either a thermoplastic polymer or a UV cured thermoset polymer.

The primary encasement, and the secondary encasement, may comprise more than one layer, each having the properties indicated. In some cases, it may be advantageous to have an inner adhesive encasement layer adjoining the optical fiber assembly.

Modifications in the geometry of the elements shown may be made while still achieving the benefits of the invention. For example, the strength members are shown in the figures as having a round cross section. Also the optical fiber system is shown with a round cross section. Either of these shapes may be varied. These modifications are illustrated in FIG. 7 where the optical fiber 71 still has an essentially racetrack shape, but the shape of both the strength members 53, 54 and the optical fiber system 55 are oval or elliptical. While this shows minor deviations in the circularity of all of the elements, it should be clear that any one or more of them may be independently varied. In each case the elements have a nominal diameter as measured in the thickness dimension of the cable, and the condition that the nominal diameter of the optical fiber system 55 is less than that of the strength members is still preferred (although not essential). Also, each of these elliptical elements has a nominal center, and the condition that the centers align along a common axis is still preferred. Even where the optical fiber system is relatively flat ellipse the functional center will be evident to those skilled in the art and means the axis of symmetry containing both focal points of the ellipse.

In the case of the arrangement shown in FIG. 1, the overall width of the cable may be reduced by using the elliptical strength members 53 and 54 of FIG. 7. In this description and the claims that follow, it should be understood that reference to diameters (e.g. $d_1$, $d_2$) and reference to centers (e.g. $C_1$ and $C_2$) are nominal references and are intended to describe the modifications just mentioned. When used, the term "essentially round cross section" is intended as meaning precisely circular, or slightly elliptical. Those skilled in the art will easily relate these modifications to the functional intent and spirit of the invention.

It will be recognized that due to the inherent design of the optical fiber cables described herein, the secondary encasement is easily stripped from the primary encasement. To facilitate easy separation of the optical fibers from the optical fiber system (primary encasement), a ripcord of known design may be included in the optical fiber system.

Various other modifications of this invention will occur to those skilled in the art. All deviations from the specific teachings of this specification that basically rely on the principles and their equivalents through which the art has been advanced are properly considered within the scope of the invention as described and claimed.

What is claimed is:

1. Optical fiber cable comprising:
   (a) at least one coated optical fiber,
   (b) a first encasement conformally coating the optical fiber, the first encasement having a diameter $d_2$ and center $C_1$,
   (c) a first strength member having a diameter $d_1$ and center $C_2$,
   (d) a second strength member having a diameter $d_1$ and center $C_3$, wherein center $C_2$, center $C_1$ and center $C_3$ are positioned sequentially along a common axis, and
   (e) a secondary encasement conformally coating the primary encasement and the first and second strength members to form a flat cable.

2. The optical fiber cable of claim 1 wherein the cable has a racetrack shape.

3. The optical fiber cable of claim 1 wherein $d_1 > d_2$.

4. The optical fiber cable of claim 1 wherein the primary encasement is a material selected from the group consisting of polyethylene and polyvinylchloride.

5. The optical fiber cable of claim 1 wherein the optical fiber cable comprises a single optical fiber.

6. The optical fiber cable of claim 1 wherein the optical fiber cable comprises two or more optical fibers bundled together.

7. The optical fiber cable of claim 1 wherein the optical fiber cable comprises two or more optical fibers ribboned together.

8. The optical fiber cable of claim 1 wherein $d_1/d_2 > 1.05$.

9. The optical fiber cable of claim 1 wherein the interface between the primary and secondary encasements is a continuous polymer-to-polymer interface.

10. The optical fiber cable of claim 9 wherein the secondary encasement is extruded over the optical fiber system.

11. The optical fiber cable of claim 9 wherein the secondary encasement is a UV cured polymer.

12. The optical fiber cable of claim 9 wherein the primary encasement is extruded over the optical fiber.

13. The optical fiber cable of claim 1 wherein the primary encasement adheres to the coated optical fiber.

14. The optical fiber cable of claim 9 wherein the interface between the coated optical fiber and the primary encasement is a continuous polymer-to-polymer interface.

* * * * *